(12) United States Patent
Samokhvalov

(10) Patent No.: US 10,950,079 B2
(45) Date of Patent: Mar. 16, 2021

(54) METHOD AND APPARATUS FOR DETERMINING THE AUTHENTICITY OF FLAT OBJECTS: BANKNOTES, DOCUMENTS, SECURITY LABELS, AND RELATED ITEMS

(71) Applicant: Morgan State University, Baltimore, MD (US)

(72) Inventor: Alexandr Samokhvalov, Ellicott City, MD (US)

(73) Assignee: Morgan State University, Baltimore, MD (US)

( * ) Notice: Subject to any disclaimer, the term of this patent is extended or adjusted under 35 U.S.C. 154(b) by 0 days.

(21) Appl. No.: 16/715,588

(22) Filed: Dec. 16, 2019

(65) Prior Publication Data
US 2020/0193756 A1   Jun. 18, 2020

Related U.S. Application Data

(60) Provisional application No. 62/780,436, filed on Dec. 17, 2018.

(51) Int. Cl.
*G07D 7/1205* (2016.01)
*G01N 21/64* (2006.01)

(52) U.S. Cl.
CPC ......... *G07D 7/1205* (2017.05); *G01N 21/643* (2013.01); *G01N 2021/6421* (2013.01)

(58) Field of Classification Search
CPC ............... G07D 7/1205; G01N 21/643; G01N 2021/6421
See application file for complete search history.

(56) References Cited

U.S. PATENT DOCUMENTS

2019/0384955 A1\* 12/2019 Frieser ................. G06K 7/1417

\* cited by examiner

*Primary Examiner* — Jamil Ahmed
(74) *Attorney, Agent, or Firm* — Whiteford, Taylor & Preston, LLP; Peter J. Davis

(57) ABSTRACT

A method and apparatus for determining authenticity of objects using synchronous fluorescence spectroscopy (SFS). The fluorescent security feature of a flat object Q is identified under illumination with ultraviolet light. Then the security feature is illuminated by a beam of light at continuously varied excitation wavelength, while the intensity of emitted light (fluorescence) is recorded at the continuously varied, yet different emission wavelength. The difference between the wavelengths of emission and excitation is held constant, and the spectrum SFS(Q) is obtained. The same procedure is conducted with a known authentic (A) object, resulting in its synchronous fluorescence spectrum SFS(A). A comparison of SFS(Q) and SFS(A) is conducted. If SFS(Q) and SFS(A) are the same, the Q object is concluded to be authentic.

10 Claims, 3 Drawing Sheets

Figure 1. Genuine U.S. $10 banknote series 2013 mounted on flat sample holder in vertical position.
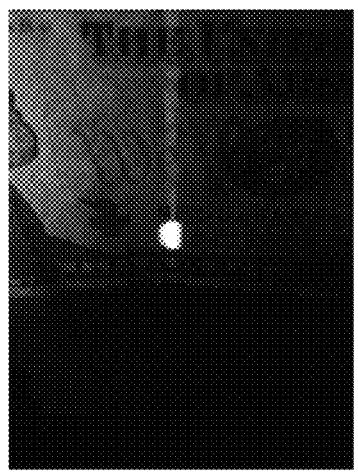
Figure 2. Genuine U.S. $10 banknote series 2013 mounted on flat specimen holder in the dark, but illuminated with both commercial UV lamp emitting at 365 nm ("primary visualization") and the excitation beam of the fluorescence spectrometer (related to the scope of this invention).

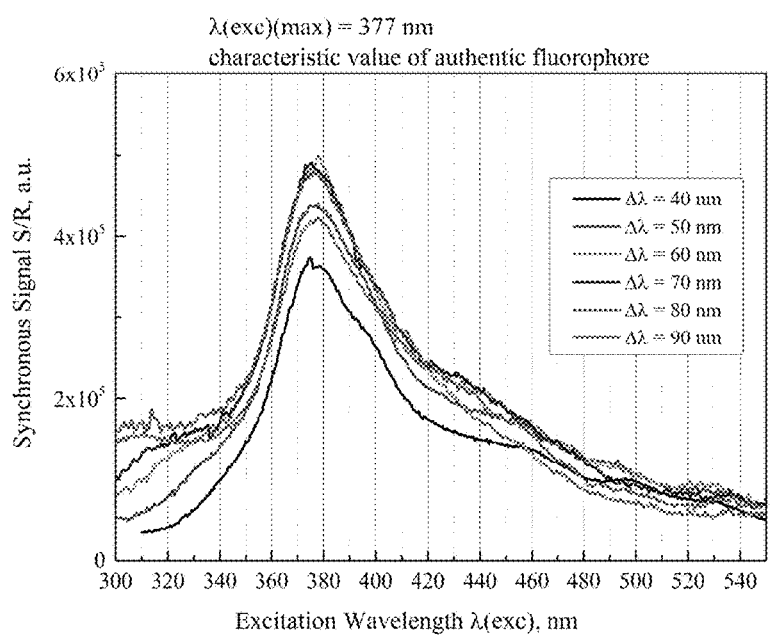
Figure 3. The set of representative synchronous fluorescence spectra of the fluorescent security thread of genuine U.S. $10 banknote series 2013 at different numeric values of Δλ parameter.

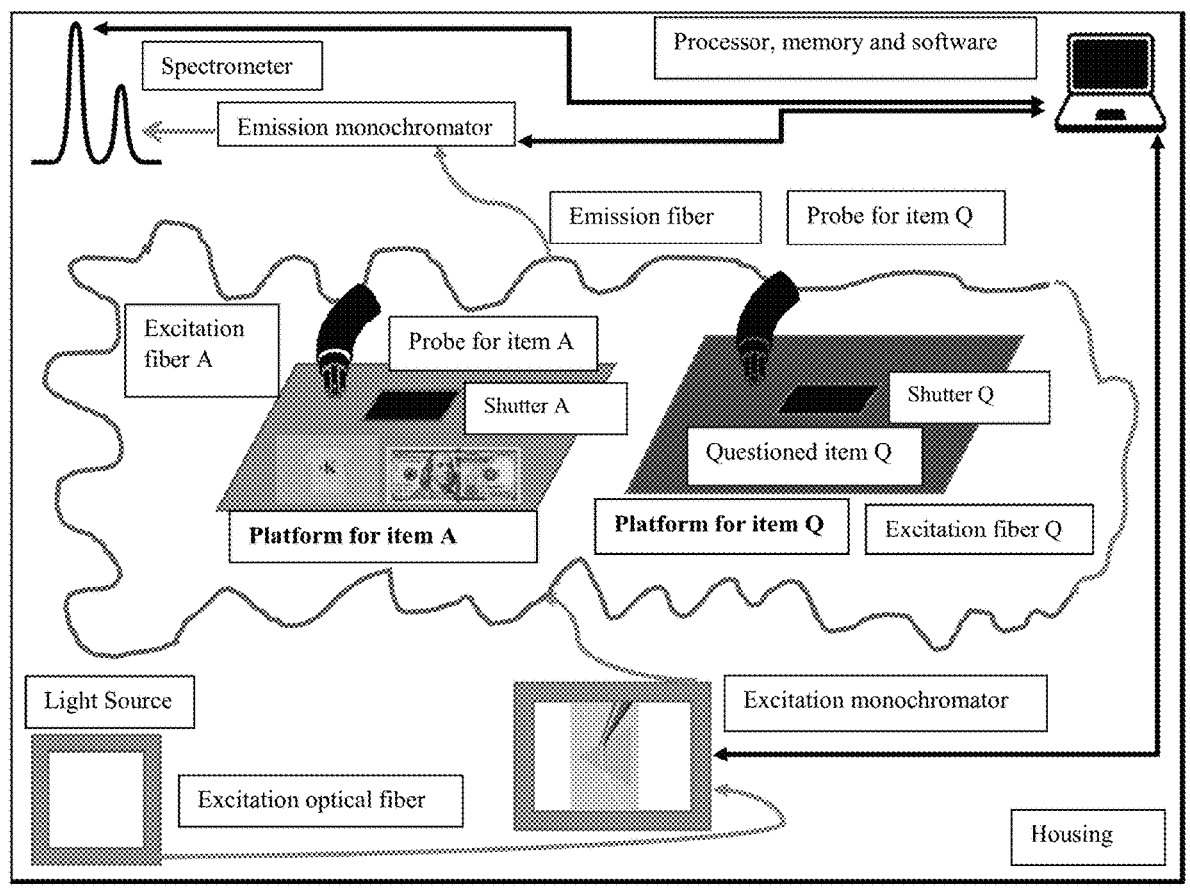
Figure 4. Design of portable dual-sample synchronous fluorescence spectroscopic comparator for determination of authenticity of flat objects.

METHOD AND APPARATUS FOR DETERMINING THE AUTHENTICITY OF FLAT OBJECTS: BANKNOTES, DOCUMENTS, SECURITY LABELS, AND RELATED ITEMS

BACKGROUND OF THE INVENTION

Field of the Invention

The present invention relates to determining the authenticity of flat objects.

Description of the Background

Fluorescent printed security features are widely used to identify legitimate/authorized paper money, other financial documents, government identification documents, and even merchandise. The primary types of fluorescent printed security features used on the banknotes of the US and other countries are fluorescent security threads, fluorescent security fibers, and weakly fluorescent banknote paper (substrate). Documents such as personal and bank checks, as well as government IDs typically use fluorescent security images, and/or fluorescent security fibers. Personnel identification tags, such as the "infrared flag" of the uniform of U.S. soldiers, use fluorescent security images and the material of the image itself.

Security labels on merchandise, for example packages of pharmaceuticals, also use fluorescent printed security features, for example, a fluorescent security logo, other fluorescent security images, and/or fluorescent security fibers. And in the apparel industry, fluorescent security features are used on fabrics, including fluorescent security logos, fluorescent security fibers, and/or the material of the fluorescent fabric itself.

The current first line of defense against counterfeiting is an eye-visible perception of color emitted from the fluorescent security feature under excitation with UV light. The current second line of defense, which has been implemented recently by certain U.S. companies and some banks and criminal investigators, is based on recording and analyzing the "conventional" fluorescence emission spectrum of the questioned object and comparing it to the spectrum of the known authentic object. According to this method, an object is illuminated with light of a certain constant excitation wavelength, and the intensity of fluorescence (emitted) light is determined for each scanned emission wavelength.

SUMMARY OF THE INVENTION

The present invention is an improved method and apparatus for determining the authenticity of certain flat objects such as currency bills, formal documents, government IDs, product labels, and fabrics in branded apparel, which method and apparatus relies on synchronous fluorescence spectroscopy.

When exposed to certain wavelengths of electromagnetic radiation (light), certain elements and chemical compositions have the ability to emit light in response to the incident radiation. This property is called fluorescence. Stated another way, fluorescence is the emission of electromagnetic radiation (light) by an object when illuminated by a source of electromagnetic radiation at a specific and different wavelength of light. Each different chemical and chemical combination has its own distinct fluorescent profile, which includes 1) the wavelength (or frequency or energy) of photoexcitation which produces the maximum intensity of photoemission and 2) the intensities of photoemission across a range of selected photoexcitation (excitation) and emission wavelengths (the spectrum). The item in 1) above is usually denoted "maximum photoexcitation wavelength." Therefore, it is possible to distinguish the fluorescent security feature of a flat authentic object from the fluorescent security feature on the counterfeit object of the same kind because the chemical composition of the materials that counterfeiters use to manufacture fluorescent security features inevitably differ from the proprietary (and highly secret) chemical composition of genuine fluorescent security features produced by original manufacturer.

That is, each authentic fluorescent security feature has a specific maximum photoexcitation wavelength (or frequency, or energy) and specific emission spectra which are particular to the specific chemical composition of the authentic fluorescent security feature. The similar, but not identical, flat object fabricated by the counterfeiter has its own maximum photoexcitation wavelength (or frequency, or energy) and spectrum which may be close, but not identical to that of an authentic object. This is due to the fact that the counterfeiter has to use the "surrogate" chemicals and technology to generate a "mimic fluorophore" because the chemical composition of the authentic fluorescent security feature is kept secret.

The unique capability of the use of synchronous fluorescence spectroscopy in the present invention is to detect the combination of characteristic wavelengths of absorption and emission of light of both the authentic and "mimic fluorophore." The present invention thus provides for the identification of counterfeit currency bills, formal documents, government IDs, product labels, fabrics in branded apparel, or other flat objects by comparing directly synchronous fluorescence spectra and/or maximum photoexcitation wavelength of the questioned and authentic objects. This capability is valuable for banks, currency depositories, security checkpoints, and inventory quality controls at retail stores, companies, and institutions. In addition, the present invention provides for connecting the origin of the specific counterfeit banknote, document, fabric or other flat object, and tracing it to the specific combination of chemicals used by counterfeiter. Consequentially, the source of supply of chemicals used to manufacture the counterfeit can be discovered.

Accordingly, there is presented according to an embodiment of the invention a method and apparatus for determination of authenticity of flat objects using synchronous fluorescence spectroscopy (SFS). According to various embodiments of the invention, flat objects may include, but are not limited to, currency bills, checks (corporate, personal, cashier), money order, formal documents, passports, driver licenses, government identification documents, wearable security tags or badges, product labels and packaging, and fabrics including those in branded apparel. Specifically with respect to fabrics, a synchronous fluorescence spectrum of a piece of questioned fabric of the given brand may be obtained according to the invention and compared to the synchronous fluorescence spectrum of the known authentic fabric of the same brand. In this embodiment, the described invention can be used for brand protection and testing the inventory at retail stores and distribution centers for counterfeit objects.

According to one embodiment of the invention, a flat object of questioned authenticity (Q) is placed on a support, and its fluorescent security feature or small area of object itself is optionally visually identified under illumination with "primary visualization" light, such as that of ultraviolet lamp. According to further embodiments of the invention, a selected area of the fluorescent security feature of the object is illuminated by a beam of light at a plurality of varied selected excitation wavelengths λ(exc), while the intensity of emitted light (fluorescence) from an object is simultaneously recorded at a plurality of varied, yet different selected emission wavelengths λ(emiss). According to one embodiment of the invention, the numeric difference between each emission wavelength and its corresponding excitation wavelength (Δλ) is kept constant during the scan, and the emission intensity spectrum SFS(Q) for a selected set of excitation and emission wavelengths of object Q is obtained. Usually, the Δλ parameter is a positive number; however, depending on how exactly it is defined, it could be negative. According to another embodiment of the invention, the numeric difference between each emission wavelength and its corresponding excitation wavelength Δλ is not kept constant, but is instead allowed to vary according to a method known as, inter alia, variable-angle synchronous fluorimetry. In either case, the same procedure is conducted with a known authentic (A) object, resulting in its synchronous fluorescence spectrum SFS(A). In addition, the excitation wavelength (maximum photoexcitation wavelength) that produces the maximum intensity emission can be determined from the SFS(Q) and SFS(A). The pair of spectra SFS(Q) and SFS(A), and/or the pair of maximum photoexcitation wavelengths of objects Q and A are then compared using a computer processor. If SFS(Q) and SFS(A), and/or the maximum photoexcitation wavelengths of Q and A objects are found to be the same within a predetermined margin of error or acceptability, the Q object is concluded to be authentic.

According to alternate embodiment of the invention, instead of measuring emission intensity at various emission wavelengths and corresponding excitation wavelengths, the invention may be carried out by measuring emission intensities at various emission frequencies and corresponding excitation frequencies. According to various aspects of this embodiment, the difference Δν between each excitation frequency and corresponding selected emission frequency may be kept constant, or it may be varied. As in the case of the Δλ parameter, the difference between the frequencies Δν is usually a positive number; however, depending on how exactly it is defined, it could be negative.

According to alternate embodiment of the invention, instead of measuring emission intensity at various emission frequencies and corresponding excitation frequencies, the invention may be carried out by measuring emission intensities at various emission energies and corresponding excitation energies. According to various aspects of this embodiment, the difference ΔE between each excitation energy and corresponding selected emission energy may be kept constant, or it may be varied. As in the case of the Δν parameter, the difference between the energies ΔE is usually a positive number; however, depending on how exactly it is defined, it could be negative.

According to various embodiments of the invention, the methods and apparatus of the invention may be used to determine the authenticity of "luminescent security features," "phosphorescent security features," and "lasing security features," where fluorescence typically refers to a process that occurs in the timescale between femtoseconds (fs) and nanoseconds (ns), phosphorescence typically refers to a process that occurs at the time scale longer than nanoseconds, and luminescence typically refers to a process that occurs in an unknown time frame, and where a "lasing security feature" means that emission from it is not occurring spontaneously, but is a stimulated process (such as the electromagnetic radiation produced by lasers).

BRIEF DESCRIPTION OF THE DRAWINGS

Arrangements of the apparatus will now be described, by way of an example only, with reference to the accompanying drawings wherein:

FIG. 1 depicts a view of a security document (U.S. $10 banknote), which is mounted on the appropriate sample holder, in accordance with an embodiment of the present invention.

FIG. 2 depicts a method of "primary visualization" of the fluorescent security feature (security thread) on security document (a U.S. $10 banknote) and focusing the beam of excitation light on it, in accordance with one embodiment of this invention.

FIG. 3 is a graph depicting an illustrative example how the characteristic maximum photoexcitation wavelength λ(exc)(max) is used in the acquisition and analysis of synchronous fluorescence spectra of the fluorescent security thread of an authentic U.S. banknote. The Δλ parameter is constant for each spectrum, but can be subsequently changed at selected increments (10 nm in this example) to collect additional spectra. From computer-assisted numeric analysis of synchronous fluorescence spectrum, the λ(exc)(max)=377 nm is determined to be the characteristic wavelength of maximum absorption of fluorophores (characteristic chemical substances) in the fluorescent security thread of the authentic $10 U.S. banknote of 2013. In this context, the characteristic wavelength of maximum absorption is the same as maximum photoexcitation wavelength.

FIG. 4 is a representation of a portable apparatus according to an embodiment of the invention.

DETAILED DESCRIPTION

FIG. 1 shows an exemplary flat object with a fluorescent security feature placed on a suitable flat specimen support according to an embodiment of the invention. According to an optional step of the invention, the fluorescent security feature may be visually detected, in a process of "primary visualization," using a commercially available ultraviolet lamp (aka "black light") which emits at 365 nm, 254 nm, or any other suitable wavelength as shown in FIG. 2. According to an alternate embodiment, the primary visualization step, if carried out, may be carried out using the illumination source used in subsequent steps.

According to a further step according to the invention, the questioned flat object with fluorescent security feature is positioned in such a way so that its fluorescent security feature, or some part of it, may be illuminated by the photoexcitation (illumination) beam of the apparatus. The apparatus may be any one of a fluorescence spectrometer, fluorimeter, spectrofluorimeter, luminescence spectrometer, phosphorescence spectrometer, or other device that is equipped for use in connection with the steps of the invention. FIG. 2, for example, shows a round bright white circle on the bottom of the fluorescent security thread of a genuine US $10 banknote, indicating the area to be analyzed.

Next, the source of light for primary visualization (if used) is removed, and ambient light is turned off and one or several synchronous fluorescence spectra are collected from the fluorescent security feature of the questioned object and of the authentic object using the identical excitation and emission parameters. Alternatively, the ambient light can remain on if the instrument allows protecting the object from ambient light. The ambient light can also remain on, if both the questioned and the authentic objects are investigated under the same ambient light.

According to one embodiment of the invention, excitation of fluorescent security feature of the flat object is conducted at a certain wavelength of photoexcitation $\lambda(exc)$, which is varied (scanned) within a predetermined range. Simultaneously, the wavelength of photoemission $\lambda(emiss)$ at which the intensity is measured, is likewise varied within a predetermined range (hence the term "synchronous" in synchronous fluorescence spectroscopy). The numeric difference between the wavelength of emission $\lambda(emiss)$ and the wavelength of photoexcitation $\lambda(exc)$ is denoted $\Delta\lambda=|\lambda(emiss)-\lambda(exc)|$ and consequentially $\Delta\lambda>0$. However, the $\Delta\lambda$ parameter defined in such a way so that $\Delta\lambda<0$ is still within the scope of this invention. Usually, the wavelength $\lambda$ of the emission radiation $\lambda(emiss)$ and the photoexcitation radiation $\lambda(exc)$ is measured in nanometers (nm). However, any and all other units of measure of the wavelength of radiation are within the scope of this invention.

In the case that only a single emission spectrum (at $\Delta\lambda(1)$) is to be taken from each of the questioned and authentic flat objects, the scanning is complete.

In the case that multiple emission spectra ($\Delta\lambda(1)$, $\Delta\lambda(2)$, $\Delta\lambda(3)$, $\Delta\lambda(3)$, ... $\Delta\lambda(n)$) are to be taken, the operator or the programmed routine of the apparatus sets the $\Delta\lambda$ at the next specific value, e.g., $\Delta\lambda(2)$, and the synchronous fluorescence spectrum at the given $\Delta\lambda(2)$ is obtained, and so on. See, e.g., FIG. 3, which shows emission spectra for the fluorescent thread of a genuine U.S. $10 banknote at six different $\Delta\lambda$, where the X-axis represents the excitation wavelength and the Y-axis represents the intensity of emission fluorescence. When $\Delta\lambda$ is changed by a constant increment, for example by 10 nm as shown in FIG. 3, the result is referred to as a constant-wavelength (CW) synchronous fluorescence spectrum.

Once the number of scanning sets has been completed, the pair or pairs of synchronous fluorescence spectra data is compared, i.e., the spectrum or spectra (if multiple scans (n) are made at different $\Delta\lambda$) of the fluorescent security feature of the questioned flat object is compared to the spectrum or spectra of the fluorescent security feature of an authentic flat object.

If the synchronous fluorescence spectra of the questioned and authentic objects are the same within a predetermined margin of error or acceptability, the questioned object is determined to be authentic. If the synchronous fluorescence spectra are different, the questioned object is determined to be not authentic (a counterfeit).

In addition to emission spectra, the excitation wavelength at which the maximum photoexcitation $\lambda(exc)(max)$ occurs is another parameter that can be used to determine whether a flat object is authentic or counterfeit. This parameter is the wavelength of maximum absorption of light, at which the highest emission intensity is observed (for the chosen $\Delta\lambda$). This characteristic maximum absorption wavelength is denoted $\lambda Q(ab)$ and $\lambda A(ab)$ for the questioned (Q) and authentic (A) objects, respectively. The maximum photoexcitation wavelength $\lambda(exc)(max)$ which is the same as $\lambda Q(ab)$ or $\lambda A(ab)$ may be derived from the emission spectra. In FIG. 3, the $\lambda(exc)(max)=\lambda A(ab)=377$ nm for an authentic U.S. $10 banknote of 2013 which value is specific to the fluorophores in the fluorescent security thread of a genuine U.S. $10 banknote. One advantage of using the maximum photoexcitation wavelength as a parameter for determination of authenticity of flat objects is that the emission intensities in the spectrum of a flat object, especially for a banknote (the Y-axis in FIG. 3), for example, can be affected by natural factors as contamination of the surface, normal wear and tear, partial loss of the fluorescent security thread due to abrasion, dissolution in water, organic solvents, bleaching under sunlight, or other factors. Any of these factors will decrease or increase the intensity Y of synchronous fluorescence spectra of the questioned object, and may result in erroneous conclusion about authenticity. Use of the maximum photoexcitation wavelength can help to minimize such errors.

According to various embodiments of the invention, comparison of the spectra alone can be used to determine authenticity of a flat object, comparison of the maximum photoexcitation wavelengths $\lambda(exc)(max)$ between the known authentic object and the questioned object may be used to determine the authenticity of the flat object, or a comparison of both the spectra and the maximum photoexcitation wavelengths between the known authentic object and the questioned object may be used to determine the authenticity of the flat object.

According to another embodiment of the invention, the $\Delta\lambda$ is not kept constant during each scan, and $\lambda(exc)$ and $\lambda(emiss)$ are varied simultaneously ("synchronously"), but at different rates. This method is known by various terms, including, inter alia, the variable-angle synchronous fluorimetry, variable-angle synchronous fluorescence spectroscopy, variable separation synchronous fluorimetry, variable offset synchronous fluorimetry, variable-angle synchronous luminescence spectroscopy and other similar terms, each of which is considered to be within the scope of the invention.

According to another embodiment of the invention, instead of the wavelength of photoexcitation $\lambda(exc)$, the frequency of the photoexcitation electromagnetic radiation $\nu(exc)$ may be used. Likewise, instead of the wavelength of emission $\lambda(emiss)$, the frequency of the emission radiation $\nu(emiss)$ can be used. The frequency of radiation is usually defined as the quantitative property which is inversely proportional to the wavelength of radiation. Usually, the frequency of radiation is measured in the inverse centimeters cm-1 which are commonly referred to as "wavenumbers." However, any and all other units of measure of the frequency of radiation are within the scope of this invention.

According to another embodiment of the invention, instead of numeric difference $\Delta\lambda$ between the wavelength of emission $\lambda(emiss)$ and the wavelength of photoexcitation $\lambda(exc)$, the difference $\Delta\nu$ between the frequency of excitation $\nu(exc)$ and the emission frequency $\nu(emiss)$ may be used, where $\Delta\nu=\beta\nu(exc)-\nu(emiss)|$ and consequentially $\Delta\nu>0$. However, the $\Delta\nu$ parameter defined in such a way so that $\Delta\nu<0$ is still within the scope of this invention.

According to these embodiments, $\Delta\nu$ parameter may be kept constant as $\nu(exc)$ and $\nu(emiss)$ are varied simultaneously ("synchronously") at the same rate during collection of spectrum, or $\Delta\nu$ parameter may not be kept constant as $\nu(exc)$ and $\nu(emiss)$ are varied simultaneously but at different rates.

According to another embodiment of the invention, instead of the frequency of photoexcitation radiation $\nu(exc)$, the energy of the photoexcitation radiation $E(exc)$ may be used. Likewise, instead of the frequency of emission radiation $\nu(emiss)$, the energy of emission radiation $E(emiss)$ can be used. The energy of emission radiation $E(emiss)$ is usually defined as the quantitative property which is directly proportional to the frequency of emission radiation $\nu(emiss)$. Usually, the energy of emission radiation $E(emiss)$ and the photoexcitation radiation $E(exc)$ is measured in Joules.

However, any and all other units of measure of energy of radiation are within the scope of this invention.

According to another embodiment of the invention, instead of numeric difference Δν between the frequency of photoexcitation radiation ν(exc) and the frequency of emission radiation ν(exc), the difference ΔE between the energy of photoexcitation E(exc) and the energy of emission E(emiss) may be used, where ΔE=|E(exc)−E(emiss)| and consequentially ΔE>0. However, the ΔE parameter defined in such a way so that ΔE<0 is still within the scope of this invention.

According to these embodiments, ΔE parameter may be kept constant as E(exc) and E(emiss) are varied simultaneously ("synchronously") at the same rate during collection of spectrum, or ΔE parameter may not be kept constant as E(exc) and E(emiss) are varied simultaneously but at different rates.

According to another embodiment of the invention, any physical property other than the wavelength, frequency or energy of radiation, but either directly or inversely proportional to any of these physical properties, can be used.

According to various embodiments of the invention, any fluorescence spectrometer may be used. According to one embodiment, a fluorescence spectrometer having only a single beam of excitation light can be used, in which case only one sample can be loaded, and the spectra and/or maximum photoexcitation wavelengths for the questioned object and authentic object must be measured sequentially. According to another embodiment, a fluorescence spectrometer having two beams of excitation light (a dual-beam spectrometer) may be used in which case two samples can be loaded simultaneously for analysis, and the questioned object and known authentic object may be analyzed simultaneously.

According to a preferred embodiment of the invention, the fluorescence spectrometer may be a portable device suitable for transport by one person from one location to another, where the described analysis is necessary.

According to a further preferred embodiment, a custom-built dual-sample spectroscopic apparatus ("synchronous fluorescence spectroscopic comparator") of the type shown in FIG. 4 may be used. The synchronous fluorescence spectroscopic comparator according to the invention may include sample platforms for two separate samples, broadband source of UV light emitting the range of λ(exc), an excitation filter, such as a monochromator, to set, change and record specific λ(exc), fiberoptic cables for delivering excitation radiation to probes on each of the sample platforms, probes for delivering the excitation radiation to samples and receiving emitted radiation from samples on both sample platforms, fiberoptic cables for delivering emission radiation from probes, an emission filter, such as a monochromator, to set, change and record specific λ(emiss), an optical spectrometer to record the intensity of fluorescence at each λ(emiss) while a monochromator can be part of spectrometer, and a processor to operate the monochromators and spectrometer, display to an operator synchronous fluorescence spectra, and save them as computer files and a software program to operate the hardware modules of the apparatus. Some or all of the foregoing may be enclosed into a housing.

Description of procedure of operation of the described apparatus. The following is a representative example of carrying out one of the methods according to the invention using one of the devices according to the invention and is not intended to be limiting in any respect:

An operator turns on modules of instrument in FIG. 4 and starts the software program. An operator places on the respective platforms of the spectroscopic comparator apparatus a) the questioned object Q and b) an authentic object A (such as banknote or fabrics e.g. the tip of sleeve of T-shirt) of the same kind.

An operator opens shutters to allow the photoexcitation light to illuminate fluorescent security features of flat objects, or flat objects themselves.

Next, depending on the kind of object A as the reference, an operator selects one of the available methods of analysis, and starts analysis.

Next, an operator visually observes on screen of the computer the spectra of an object A and object Q, and their key numeric parameters λA(ab) and λQ(ab).

The software program conducts mathematical processing of each synchronous fluorescence spectrum of Q and A objects, and presents λA(ab) and λQ(ab) to the operator.

If λA(ab)=λQ(ab) within the statistical confidence range, the Q object is determined to be authentic. If not, the Q object is determined to be counterfeit. An operator prints and saves Forensic Report with conclusion of analysis and key numeric metrics used in the determination.

Finally, an operator removes object Q from the apparatus and inserts the next questionable object Q1 for the next analysis against the same authentic object A.

When necessary, an operator replaces object A of the given kind (such as banknote of the given denomination and year) with object A of another kind, and repeats the steps above.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

The invention claimed is:

1. A method for determining the authenticity of a test object security feature, comprising:
   a) in a test object exposing step, exposing the test object security feature to ultraviolet radiation across a range of selected test object excitation wavelengths or frequencies or energies;
   b) simultaneously with said test object exposing step, measuring a test object intensity of radiation emitted from said test object security feature across a range of selected test object emission wavelengths or frequencies or energies;
   c) preparing a test object emission spectrum from test object intensity measurements;
   d) in an authentic object exposing step, exposing a security feature of a known authentic object to said range of selected authentic object excitation wavelengths or frequencies or energies;
   e) simultaneously with said authentic object exposing step, measuring an authentic object intensity of radiation emitted from said authentic object security feature in a range of selected authentic object emission wavelengths or frequencies or energies;
   f) preparing an authentic object emission spectrum from authentic object intensity measurements;

g) wherein said test object excitation wavelengths or frequencies or energies are the same as said selected authentic object excitation wavelengths or frequencies or energies, and wherein said selected test object emission wavelengths or frequencies or energies are the same as said selected authentic object emission wavelengths or frequencies or energies;

h) and either i) determining a test object excitation wavelength or frequency or energy that produced a test object maximum emission intensity, determining an authentic object excitation wavelength or frequency or energy that produced an authentic object maximum emission intensity, comparing said test object exposure wavelength or frequency or energy to said authentic object exposure wavelength or frequency or energy, and making a determination that said test object is not authentic if said test object exposure wavelength or frequency or energy and said authentic object exposure wavelength or frequency or energy are not equal within a predetermined margin of error;

or ii) comparing said test object emission spectrum to said authentic object emission spectrum, and making a determination that said test object is not authentic if said test object emission spectrum and said authentic object emission spectrum are not equal within a predetermined margin of error, or i) and ii).

2. A method according to claim 1, wherein each selected test object emission wavelength or frequency or energy in said range of selected test object emission wavelengths or frequencies or energies is maintained at a constant numeric difference ($\Delta\lambda$ or $\Delta\upsilon$ or $\Delta E$) from a corresponding selected test object excitation wavelength or frequency or energy.

3. A method according to claim 1, wherein said selected test object emission wavelengths or frequencies or energies differ from a corresponding selected test object excitation wavelengths or frequencies or energies in varying amounts.

4. A method according to any one of claim 1, wherein said measuring a test object intensity of radiation emitted from said test object security feature in a range of selected test object emission wavelengths or frequencies or energies; and said measuring an authentic object intensity of radiation emitted from said authentic object security feature in a range of selected authentic object emission wavelengths or frequencies or energies are carried out at in the same apparatus at the same time.

5. A method according to any one of claim 1, wherein said measuring a test object intensity of radiation emitted from said test object security feature in a range of selected test object emission wavelengths or frequencies or energies; and said measuring an authentic object intensity of radiation emitted from said authentic object security feature in a range of selected authentic object emission wavelengths or frequencies or energies are carried out at in the same apparatus at different times.

6. A method according to any one of claim 1, wherein said test object is selected from the group consisting of passport, driver license, state identification, paper money, banknote, check, money order, merchandise label, uniform patch infrared flag and fabric.

7. A method according to claim 2, further comprising repeating steps a through g for a plurality of different constant numeric differences $\Delta\lambda$ or $\Delta\upsilon$ or $\Delta E$.

8. A method according to claim 1, further comprising visually detecting the test object security feature in a primary visualization step.

9. A method according to any one of claim 1 wherein said test object security feature is selected from the group consisting of a fluorescent security thread, a fluorescent security fiber, fluorescent paper, a fluorescent security image, and a fluorescent fabric.

10. An apparatus comprising:
a housing;
a first platform situated in said housing;
a second platform situated in said housing;
a source of ultraviolet radiation;
an excitation filter (monochromator);
optical fiber configured to deliver ultraviolet radiation from said source of ultraviolet radiation through said excitation filter to each of said first platform and said second platform;
a first excitation probe situated in said housing to deliver excitation light and collect emission light resulting from ultraviolet radiation exposure to items on said first platform;
a second excitation probe situated in said housing to deliver excitation light and collect emission light resulting from ultraviolet radiation exposure to items on said second platform;
an emission filter (monochromator);
an emission spectrometer;
optical fiber configured to deliver radiation from said first and second excitation probes to said emission filter and said emission spectrometer;
a processor configured to compute and compare emission spectra and/or wavelength or frequency or energy of maximum absorption for samples situated on each of said first platform and said second platform.

* * * * *